United States Patent [19]
Gropper

[11] 3,800,283
[45] Mar. 26, 1974

[54] CREDIT VERIFYING UNIT

[75] Inventor: John L. Gropper, Long Beach, N.Y.

[73] Assignee: Sanders Associates, Inc., Nashua, N.H.

[22] Filed: Nov. 12, 1969

[21] Appl. No.: 875,886

[52] U.S. Cl.............................. 340/149 A, 179/2 CA
[51] Int. Cl...... G05b 1/00, G06k 5/00, H04m 17/02
[58] Field of Search.......... 340/149, 152; 179/2 CA, 179/2 DP, 90 BB, 90 CS; 235/61.7 B, 61.11 D, 61.12 M

[56] References Cited
UNITED STATES PATENTS

| | | | |
|---|---|---|---|
| 3,274,346 | 9/1966 | Silber | 179/90 |
| 3,308,238 | 3/1967 | Brothman et al. | 340/152 X |
| 3,359,369 | 12/1967 | Di Iorio et al. | 179/2 DP |
| 3,495,229 | 2/1970 | Kuehnle | 179/90 BB |
| 3,513,298 | 5/1970 | Riddle et al. | 340/149 X |
| 3,514,549 | 5/1970 | Askew | 179/90 CS |
| 3,530,280 | 9/1970 | Goldman | 340/149 X |

*Primary Examiner*—Donald J. Yusko

[57] ABSTRACT

A system for verifying the credit of a customer at the point of sale is described which uses a standard credit card including a magnetic stripe on which the customer's identification number is recorded in dual tone form similar to the "touch-tone" system used by the telephone company. A small unit is located right at the point of sale, for example, on the counter of a retail store or adjacent the gasoline pumps of an automobile service station. When the card is inserted into the unit, the unit automatically dials the telephone number of the credit card company's central computer. When a connection has been made, the credit card is drawn along a simple magnetic read head which generates an audio signal which is coupled to the telephone line directly without the necessity for any encoding or decoding or alteration in form. The receipt of these tones by the computer constitutes an interrogation whereupon the computer checks the customer's credit and generates an appropriate signal, preferably in the form of one or more audio tones, and returns it to the unit which displays the results by illuminating a suitable lamp which indicates that credit is approved or that credit is denied or that the merchant should pick up his telephone for other instructions.

14 Claims, 7 Drawing Figures

PATENTED MAR 26 1974
3,800,283
SHEET 1 OF 4
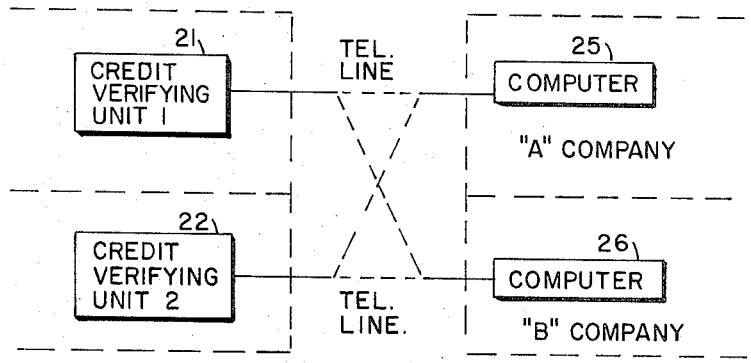
FIG. 1
FIG. 2
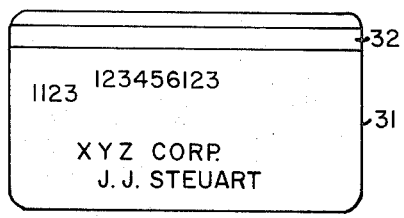
FIG. 3
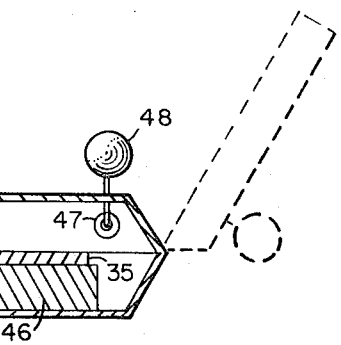
FIG. 5
INVENTOR
JOHN L. GROPPER
BY W. L. Hunter
ATTORNEY

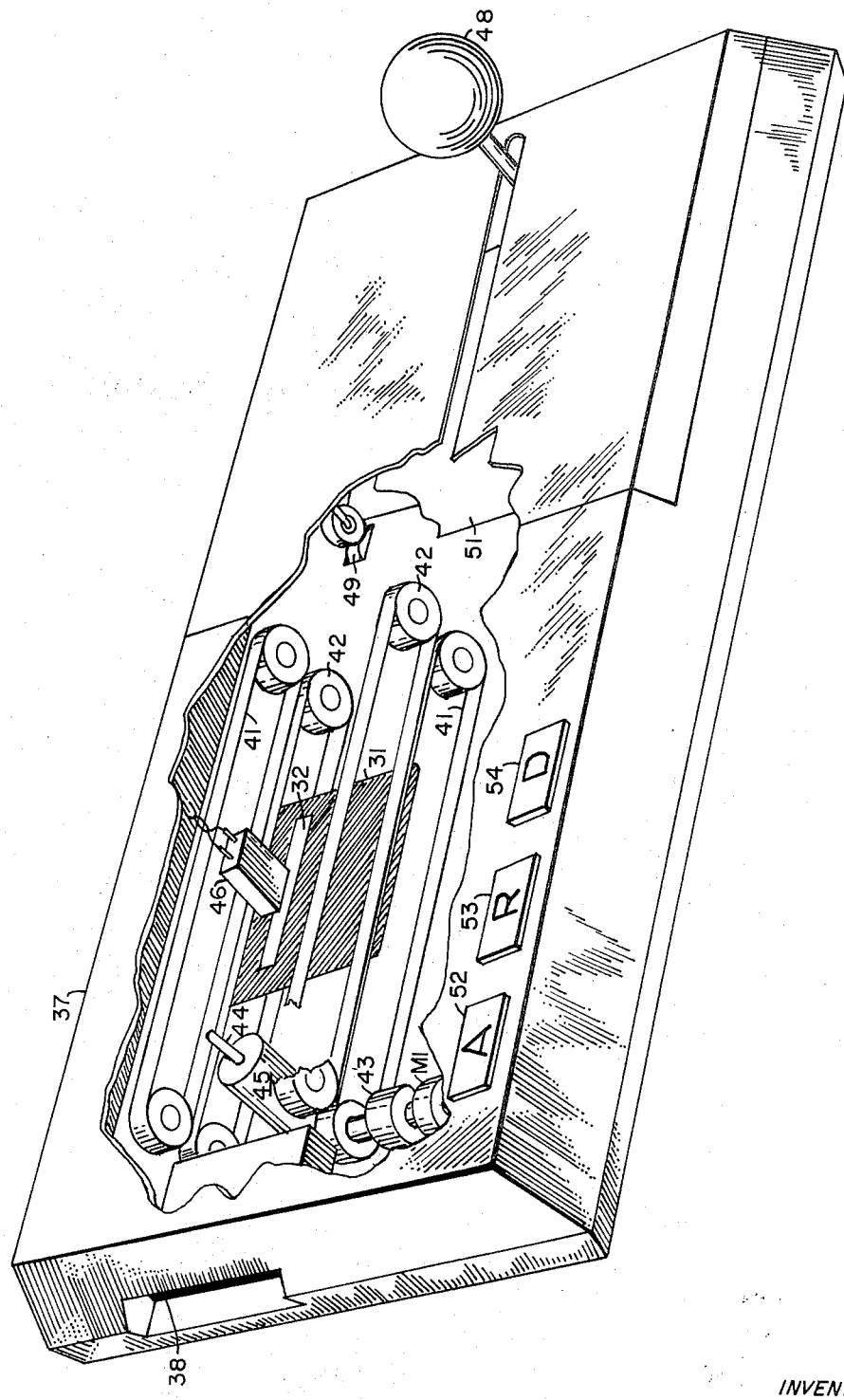

CREDIT VERIFYING UNIT

FIELD OF THE INVENTION

This invention relates generally to data storage and retrieval systems and particularly to an arrangement which enables a retail merchant to obtain, immediately and right at the point of sale, up to the minute credit information about a prospective customer.

BACKGROUND OF THE INVENTION

The use of credit cards is widespread and expanding rapidly. Credit cards have an obvious advantage from the point of view of the user in that they establish his credit immediately and without question. However, serious problems have arisen regarding lost, stolen, cancelled, counterfeit, or otherwise invalid credit cards. The fact that a credit card has been lost or stolen is ordinarily made known immediately by the user to the credit card company whose headquarters are aware of the situation. Similarly, if for some reason a card has been cancelled, this fact is also known to the headquarters of the credit card company. However, there is a considerable time lag between the knowledge of the headquarter and the knowledge of the many thousands of retail outlets throughout the country to whom a credit card may be presented. Additionally, even if the retail outlet had a list of cancelled credit cards, considerable time would be spent by the retail sales person in checking this list each time a credit card was presented. These problems are known to all credit card companies but so far, at least to Applicant's knowledge, no satisfactory solution has been found.

PRIOR ART

It has been proposed in the past, when a retail merchant is presented with a credit card, that he send the data thereon to a central location to have the credit rating of the potential customer checked before the sale is completed. Many such systems have been proposed but all of them, as far as Applicant is aware, have been subject to one or more serious disadvantages. Some such systems have required that the sales person manually encode the data via a keyboard before the information is sent to the central location. Such an arrangement obviously takes a considerable amount of the employee's time and is subject to human errors during the encoding process. Some systems have required that the information be converted to digital form before transmission but such systems normally require digital storage arrangements and equipment for converting the information to a form suitable for transmission over ordinary voice quality telephone lines. Other systems have proposed simply that the employee make a telephone call to the central location before each sale but such an arrangement obviously would annoy the potential customer and would also take a lot of the employee's time. Other arrangements have been proposed which read the information embossed on a card, either in alphanumeric form or in code, but such systems require an elaborate reading device and in addition require another device to convert the information thus read to a form suitable for transmission.

It is a general object of the present invention to provide a system by which a retail merchant can obtain immediately up-to-data credit information right at the point of sale regarding a potential customer who presents a credit card.

Another object of the invention is to provide a credit verifying unit for use at the point of sale, which unit is small, inexpensive, and simple to operate.

Another object of the invention is to provide a credit verifying unit which is capable of communicating with a central station over commercial voice grade telephone lines.

SUMMARY OF THE INVENTION

Briefly stated, a preferred embodiment of the invention comprises a unit, preferably located at the point of sale which accepts a standard credit card having a magnetic stripe on which is recorded, in dual tone form, the customer's identification number. The unit also includes a magnetic tape cartridge on which is recorded the telephone number of the credit card company's central computer in pulse format or in dual tone form as specified by the telephone company. With the cartridge and the credit card in place, the unit automatically places a telephone call to the computer, then draws the credit card along a magnetic read head, thereby generating an audio signal indicative of the customer's identification number which signal is transmitted over the telephone line to the computer thereby interrogating it. The computer replies, preferably by a code comprising one or more audio tones, which indicate whether the customer's credit is acceptable. Preferably, the unit displays the decision by means of suitable indicator lamps. The unit may also include apparatus for printing an invoice.

BRIEF DESCRIPTION OF THE DRAWINGS

For a clearer understanding of the invention, reference may be made to the following detailed description and the accompanying drawings, in which:

FIG. 1 is a schematic diagram of a credit verifying system incorporating the invention;

FIG. 2 is a plan view of a credit card suitable for use in the present invention;

FIG. 3 is a pictorial view of a tape cartridge suitable for use in the present invention;

FIG. 4 is a pictorial view, partly schematic and with portions cut away, of a credit verifying unit according to the invention;

FIG. 5 is a longitudinal cross section view, partly schematic, at the credit verifying unit of FIG. 4;

DETAILED DESCRIPTION OF THE PREFERRED EMBODIMENTS

Figure 6:
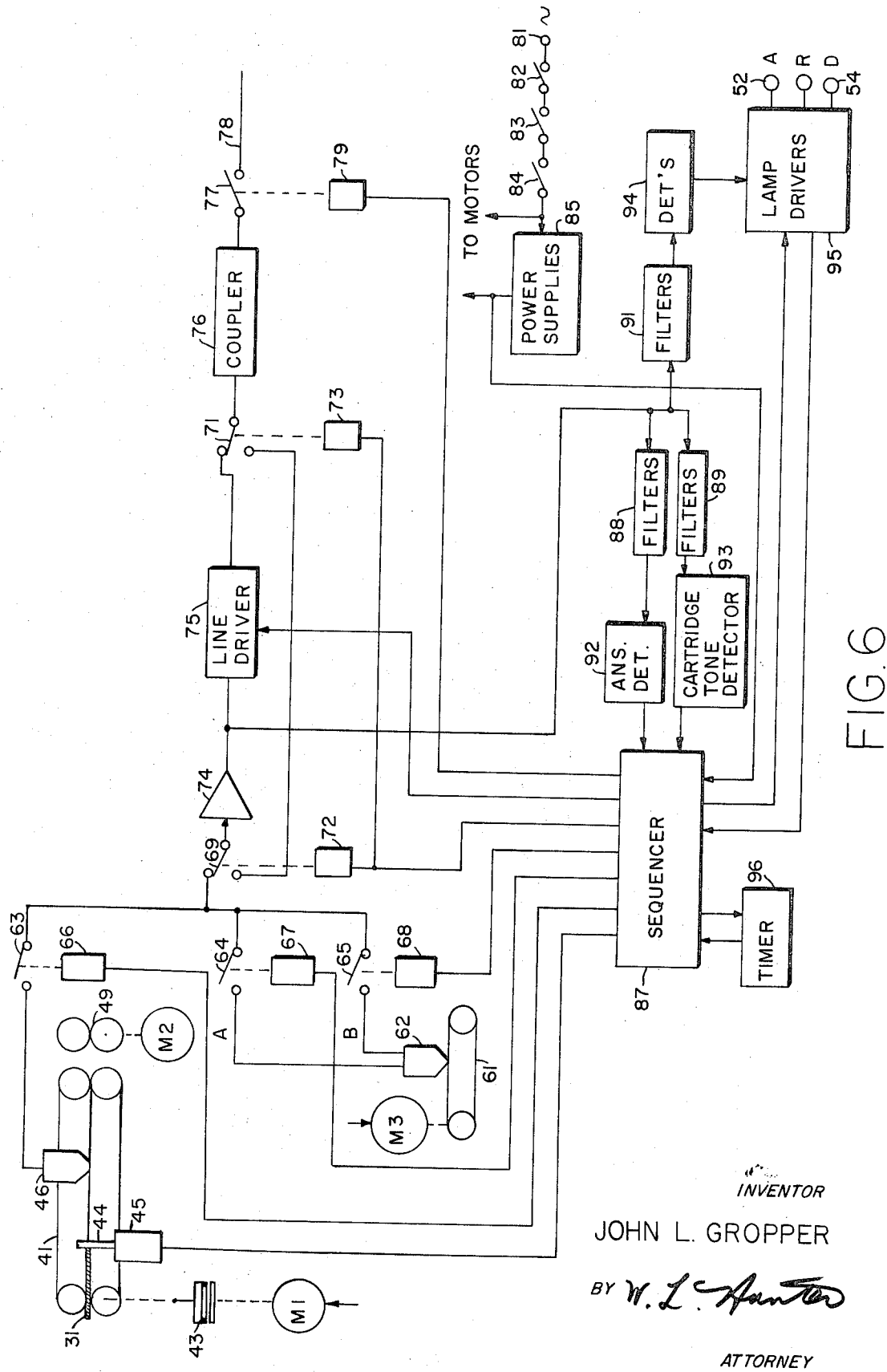
FIG. 6 is a schematic block diagram of a credit verifying unit according to the invention.

Referring to FIG. 1 there are shown two credit verifying units 21 and 22 which may be but two of many hundreds or even thousands of similar units. These units are preferably located at the point where sale is to be consummated, for example, at or under the counter of a retail store or adjacent to the gasoline pumps of an automobile service station. Each unit is connected to an ordinary telephone line which may be one of the lines serving the retail establishment. Also shown are two computers 25 and 26, each serving a different credit card company such as the "A" company and the "B" company respectively. Each of these computers may be installed at some location convenient to the particular company which it serves. It is contemplated that each of the many credit verifying units such as the units 21 and 22 will be capable of communicating over ordinary telephone lines with any number of central computers which are typified by the computers 25 and 26.

Referring to FIG. 2 there is shown a typical standard credit card 31 having the customer's name, his identification number, and other pertinent information embossed thereon to enable an invoice to be printed. The card also contains a magnetic stripe 32 on which the customer's identification number is recorded by what is called herein the dual tone form. By this arrangement each decimal digit is assigned a unique combination of two audio frequencies, or tones, which are recorded simultaneously to designate that digit. This arrangement has a number of advantages. For example, both the recording and the reading can be done with the standard equipment and techniques currently in common use to record and reproduce music. Another, and perhaps more important advantage, is that the information can be transmitted over a telephone line directly as read from the card, without the necessity for any encoding or changes in its form. It is preferred at present to use that combination of four "low" tones and three "high" tones which are now used by the Bell System Telephone Companies in their "touch-tone" system. These tones are, in hertz, $697 \mp 4$, $770 \mp 4$, $851 \mp 4$, $941 \mp 4$, $1,209 \mp 7$, $1,336 \mp 7$ and $1,477 \mp 7$. These tones have been selected as being particularly suitable for the usual voice quality telephone lines. By selecting one low tone and one high tone, unique combinations of tones for each of the 10 decimal digits and for two additional characters can be established.

Referring now to FIG. 3, there is shown a tape cartridge 35 on the outside of which there is embossed the name of the service establishment, its address, its identification number, and also the name of the credit card company. Within the cartridge, there is the usual endless loop of tape having two tracks, track A and track B. Recorded on track A of the tape is the telephone number of the central computer belonging to the particular credit card company. This information is preferably recorded in the dual tone form wherever the local telephone company equipment is compatible therewith. Elsewhere it may be recorded in a pulse format suitable for generating automatic dialing signals. For illustration purposes herein, it is assumed that the telephone company equipment will respond properly to the dual tone form of signals. Depending upon the length of the tape, the telephone number may be recorded one or more times. The portion of the tape from the end of one telephone number recording to the beginning of the next has recorded thereon a unique continuous identifying signal, such as an audio tone, for purposes which will appear. Track B carries a recording of the service establishment's identification number, preferably in the dual tone form. The remainder of this track also has a unique signal, such as an audio tone, recorded thereon for identification purposes.

Referring now to FIGS. 4 and 5, there is shown the general appearance of a credit verifying unit in accordance with the present invention. The unit includes a case 37 having an opening 38 formed in one end thereof for the reception of a credit card. Within the case are two pairs of belts 41 which are engaged by rollers 42 driven by a motor 41 through a slip clutch 43. A stop 44 operated by a solenoid 45 is placed in the normal path of a credit card so as to hold it in an initial position until the various circuits are ready, as will be more fully explained. A magnetic pick-up unit 46 with a single read head is positioned to engage the magnetic stripe in the card when it is drawn between the belts. To the right of the unit, as viewed on FIGS. 4 and 5, the cartridge 35 is positioned on top of a drive unit 46 which includes the usual motors, capstans, pulleys, and magnetic pick-up units to render the tape in the cartridge 35 operative. A print roller 47 may be operated by a knob 48 which also serves to raise the hinged lid of the right hand portion of the unit. A drive wheel 49 serves to transport the credit card from the belts 41 to the print station on top of the cartridge, so that an invoice can be printed showing the name of the customer, the name of the service establishment, and the name of the credit card company. The unit also includes three indicator lamps, which, when illuminated, indicate the status of the potential customer's credit.

In operation, the employee first looks at the customer's credit card to determine which credit company is involved. He then inserts the appropriate cartridge in the machine, closes its cover, and puts the credit card in the opening 38. The card at first comes to rest against the stop 44 but, after telephonic connection has been made with the computer, the stop is withdrawn. The card is then drawn past the pick-up unit 46 which reads off the identification number and transmits it to the computer thereby interrogating it. In response, the computer checks the credit rating of the customer and sends back a suitable signal which illuminates one of the lamps 52, 53 or 54. In the meantime, the drive wheel 49 engages the card 31 and draws it to the print station. If the credit is acceptable an invoice can be printed. If not, the cover can be lifted and the credit card removed.

Referring now to FIG. 6, there is shown schematically the previously mentioned belts 41, the credit card 31, the stop 44 with its operating solenoid 45, the motor M1, the clutch 43, the pick-up unit 46 and the drive wheel 49. Also shown is a motor M2 connected to the drive wheel 49. (It would be possible to use a single motor but at present two are preferred in order to avoid complicated drive mechanisms.) An endless magnetic tape 61 is shown which is the tape within a typical cartridge such as the cartridge 35. The tape 61 is driven by a motor M3 and the information on the two tracks of the tape is read by a magnetic pick-up unit 62 having two read heads. The single magnetic head in the pick-up unit 46 and the two magnetic heads in the pick-up unit 62 are connected to switches 63, 64 and 65, respectively which, in turn, are operated by windings 66, 67 and 68, respectively. The other terminal of these switches are connected together and to one terminal of a double throw switch 69 which constitutes a portion of a transmit receive switch, the other portion of which is another double throw switch 71. These switches are operated by windings 72 and 73 respectively. The common terminal of the switch 69 is connected to the input of an amplifier 74 the output of which is connected to a line driver 75. The line driver is merely a mechanical or electronic switch and is a convenient way of preventing a signal from going to the telephone line without disconnecting the line itself. The line driver 75 may be enabled by receipt of an appropriate signal as will be more fully explained. The output of the line driver goes to one terminal of the switch 71, the common terminal of which is connected to a coupler 76, such as a transformer, which is in turn connected through a "hook switch" 77 to a commercial telephone line 78. The switch 77 corresponds to the hook switch of a wall telephone or to the cradle switch of a desk telephone and is operated by a winding 79. It is to be understood that FIG. 6 is schematic, and although the various switches have been shown as mechanical switches, electromagnetically operated, this showing is illustrative only and the switches may, of course, be other kinds such as solid state switches.

The alternating current power is connected to a terminal 81 and from there it is connected through interlock contacts 82, 83 and 84 which are normally open as shown, but which are closed when a credit card is inserted into the unit, when a cartridge is inserted into the unit, and when the cover of the unit is closed, respectively. After passing through these switches, the power goes to the various motors and also to a power supply unit 85 which converts the power into a form suitable for use by the various electronic components. One of these components is a sequencer 87 which controls the operation of the apparatus, as will be more fully explained.

The output of the amplifier 74 is connected to three groups of filter networks 88, 89, and 91. Each of these filter networks is arranged to pass only a preselected band, or bands, of frequencies and their outputs are connected to detecting circuits 92, 93 and 94 respectively, each of which generates a useful output signal when its associated filter network passes one or more bands of frequencies to which it is tuned. The circuit 94 is a group of detectors which are connected to the lamp driver circuit 95 so as to energize the appropriate signal lamp upon receipt of a signal from the computer. The detector circuits 92 and 93 receive inputs from the filters 88 and 89 respectively and deliver their signals to the sequencer 87. Also connected to the sequencer is a timer 96. This timer may be any of several kinds but preferably it is one whose output is normally zero and which, in response to receipt of a positive going signal, starts its timing cycle. At the end of a predetermined time, for example, 3 seconds, the timer 96 generates a positive going output signal which lasts for a short time and then goes to zero. The timer 96 may, for example, be a resistance capacitance delay circuit connected to the input of a one shot multivibrator.

Figure 7:
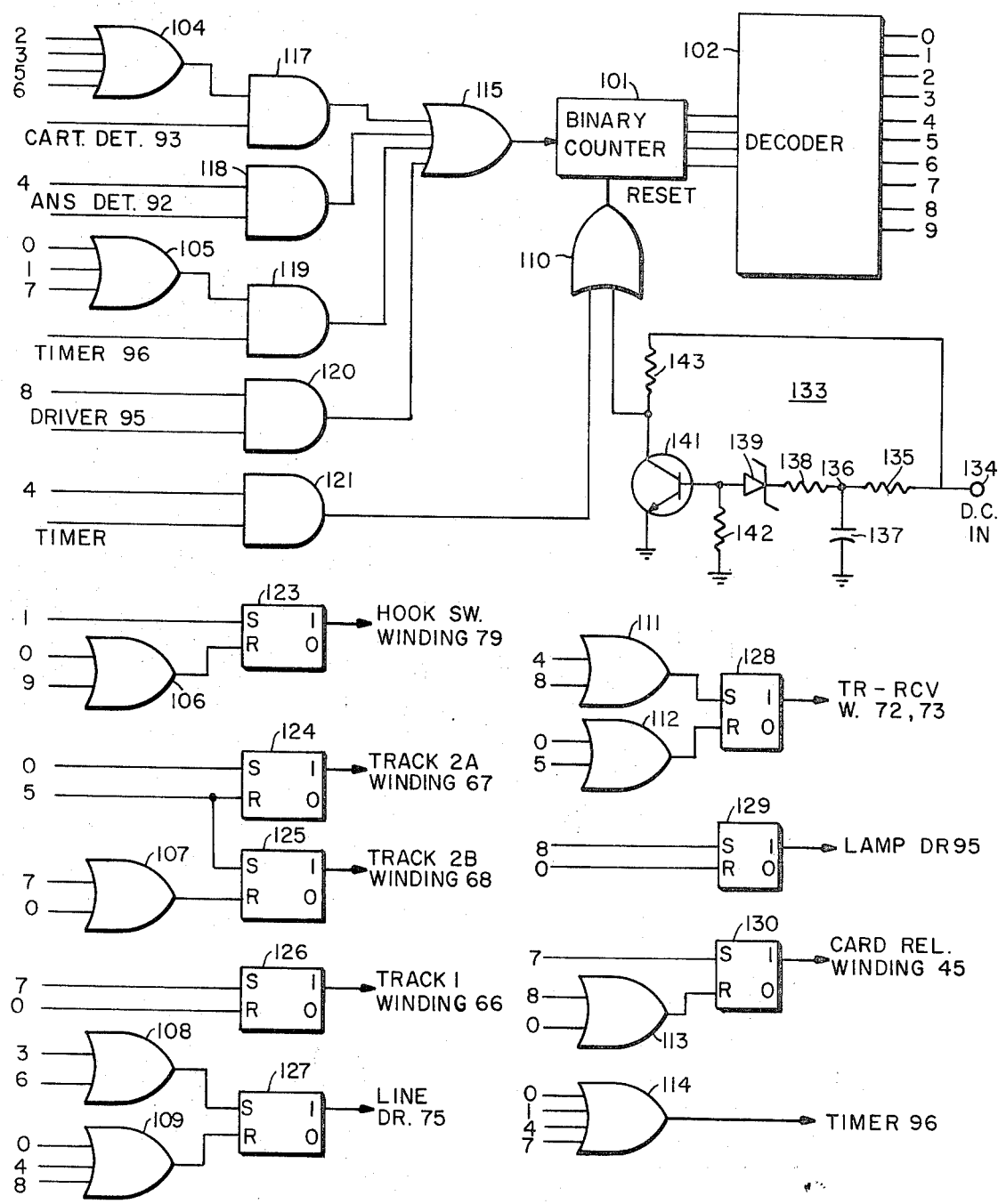
FIG. 7 is a schematic block diagram of the sequencer shown in FIG. 6.

The details of the sequencer 87 are shown in FIG. 7. It comprises principally a binary counter 101 which counts input signals. It may be reset to zero by a positive going signal applied to the reset terminal. The output of the binary counter is connected to a decoder 102, the function of which is simply to place a signal, such as a positive voltage, successively on each of 10 output conductors numbered 0 to 9 inclusive. The sequencer receives inputs from the power supply 85, from the timer 96, from the answer detector 92, from the cartridge tone detector 93 and from the lamp driver circuit 95. In turn, the sequencer delivers outputs to the relay windings controlling the hook switch 77, the transmit receive switches 69 and 71, the track selecting switches 63, 64 and 65, the line driver 75, the winding 45 for operating the card release stop 44, the timer 96 and the lamp driver circuit 95. The control circuit includes 11 logical OR circuits 104 to 115 inclusive, 5 logical AND circuits 117 to 121 inclusive, and 8 flip flop circuits 123 to 130 inclusive. For the purposes of this application the drawing conventions have been adopted of identifying logic circuits not only by their shape but by the inclusion of the "+" sign in the case of OR and a "." in the case of AND circuits and the letters FF in the case of flip-flop circuits. Additionally, a power on reset signal circuit is indicated generally by the reference character 133. The latter circuit comprises an input terminal 134 for receiving the dc power from the supply circuit 85 which terminal is connected through a resistor 135 to a junction 136. A capacitor 137 is connected between this junction and ground and a resistor 138 has one terminal connected to the junction 136 and the other terminal connected to the cathode of a Zener diode 139, the anode of which is connected to the base of a transistor 141. This base is also connected to ground through a resistor 142. The emitter of the transistor 141 is grounded. The collector of the transistor is connected through a resistor 143 to the input terminal 134. The collector of the transistor 141 is also connected to the logical OR circuit 110, the output of which is connected to the reset terminal of the binary counter 101. In FIG. 7, most of the connections are denoted by numerals to avoid confusing the drawing. That is, the numerals 0 to 9 inclusive represent the output lines of the decoder circuit 102 and these are connected to various portions of the circuit as are indicated by the numerals 0 to 9 appearing throughout the drawing. The connections to external parts of the circuits are denoted by legends and by the reference characters appearing in FIG. 6.

Operation

The operation of the machine is started by inserting the proper cartridge into the unit, by closing the cover, and by inserting the customer's credit card into the slot 38. These operations close the interlock circuits 82, 83 and 84, thereby putting power on all of the motors and energizing the power supply circuits 85. These circuits supply all of the electronic components including the sequencer 87. When a positive voltage appears on the terminal 134 (FIG. 7) the transistor 141 is non-conductive because the capacitor 137 is not yet charged. Therefore, the input voltage is applied through the resistor 143 to the logical OR circuit 110 and resets the binary counter to zero. This in turn causes an output voltage to appear on the number zero conductor of the decoder 102 which in turn sets the initial conditions. Soon the capacitor 137 charges sufficiently to cause the Zener diode 139 to conduct, thus rendering the transistor 141 conductive thereby reducing the potential of its collector to near ground thus removing the "reset" signal from the counter 101.

Initial Conditions - State 0

In response to the presence of power from the circuit 85, as explained above, a signal is placed on the zero conductor. Through the circuitry shown in FIGS. 6 and 7 the details of which are believed to be obvious, this signal opens the hook switch 77, places the switches 69 and 71 in "transmit" position, selects recording track 2A (which bears the computer's telephone number) by closing switch 64, and starts the timer 96.

State 1

Upon the elapse of approximately 3 seconds, as determined by the receipt of a signal from the timer 96, the counter 101 is advanced and conductor 1 is energized thereby closing the hook switch 77. The purpose of starting with an "off-line" condition is to permit the unit to "hang-up" if necessary later on as will be more fully explained. In addition, the presence of the signal on conductor 1 again starts the timer 96. This is to insure the probable presence of a dial tone on the line. (Alternatively, a dial tone detector might be employed but, at present, it is felt that the additional complication is not warranted.)

State 2

Upon the elapse of about 3 seconds, as indicated by the receipt of a signal from the timer 96, the No. 2 conductor is energized and the apparatus waits for a signal from the cartridge tone detector 93. This insures that the portion of the tape passing over the playback head 62 at that instant does not contain dial information and prevents the start of dialing in the middle of a sequence.

State 3

Upon receipt of an output from the cartridge detector 93, the line driver 75 is enabled. The coded telephone number, in telephone company approved form, is sent over the line in order to establish a telephonic connection with the credit card company's computer.

State 4

When the dialing operation is completed, there will again be a tone from the track 2A and when this is received by the cartridge detector 93 a signal will be put on conductor no. 4. This signal disables the line driver, shifts the transmit receive switches 69 and 71 to the receive condition and starts the timer 96.

State 5

During the running of the timer 96, the sequencer 87 waits for an output from the answer detector 92. A response from this detector indicates that the computer has been connected to the telephone line and is awaiting information. If no answer is received while the timer is running its course, a signal from the timer will operate through circuits 121 and 110 to reset the counter 101 to 0 and start the whole sequence all over again. However, if a signal is received from the answer detector 92 before the timer has run its course, the track 2A switch will be opened, the track 2B switch will be closed and the transmit receive switches 69 and 71 will be placed in the transmit position.

State 6

Track B of the tape 61 also contains a distinctive signal, preferably a tone, on that portion which is not filled with the service establishment's identification number. Upon receipt of this tone and its detection by the detector 93 the line driver 75 is enabled and the service establishment's identification number is sent out over the line in dual tone form.

State 7

After the identification number has been read by the head 62 the tone will again appear and when this tone is again detected by the detector 93 the track 2B switch 65 is opened, the track 1 (credit card) switch 63 is closed, the card release solenoid 45 is energized and the timer 96 is started again. The credit card is drawn over the head 46 and the customer's number is sent out over the line in dual tone form. The receipt of this signal by the computer constitutes an interrogation and the computer searches the credit records of the particular customer.

State 8

Upon the elapse of 3 seconds from the initiation of the previous state, as indicated by the receipt of the signal from the timer 96, the switches 69 and 71 are shifted to the "receive" position, the line driver is disabled, and the lamp driver circuit 95 is enabled. The apparatus is now in condition to receive a credit report from the computer.

State 9

The information coming back from the computer is preferably a time-coded two-tone audio signal. The signal is detected, decoded and the resulting output lights one of the three indicator lamps. If it lights the "referral" lamp, it is a signal for the attendant to pick up his telephone which is already connected to the central location. However, if either the "approved" or "denied" signals is received, the appropriate lamp is illuminated and the hook switch 77 is opened thereby breaking the connection to the computer. The attendant now knows whether he can go ahead and make the sale on credit and, if so, he can print an invoice in the usual manner.

It is apparent from the foregoing description that Applicant has provided an improved credit verifying unit. A retail merchant can obtain up-to-the-minute credit information on a potential customer immediately and right at the point of sale. The equipment required is small, inexpensive, and easy to operate. It can communicate with many central offices simply by using commercially available telephone lines.

Although a preferred embodiment of Applicant's invention has been described in considerable detail for illustrative purposes, many modifications will occur to those skilled in the art. It is therefore desired that the protection afforded by Letters Patent be limited only to the true scope of the appended claims.

What is claimed is:

1. A credit verifying unit for use with a card formed with a magnetic stripe on which a customer's identification number is recorded in dual tone form, comprising means for automatically establishing a communication link between said unit and a central computer over a voice grade commercial telephone line, playback means for reading the information on said stripe and generating a signal indicative thereof, means for applying said signal to said telephone line, means for receiving coded messages over said telephone line, and means for displaying the information content of said messages.

2. A credit verifying unit in accordance with claim 1 in which said playback means includes a magnetic pick-up unit and transport means for drawing said card along a path with said stripe in engagement with said pick-up unit.

3. A credit verifying unit in accordance with claim 2 including means for delaying operation of said transport means until said communication link is established.

4. A credit verifying unit in accordance with claim 1 in which said means for establishing a communication link includes a magnetic storage medium on which the telephone number of said central computer is magnetically recorded and which also includes additional playback means for reading the information on said medium and generating a signal indicative thereof and which also includes means for applying said signal to said telephone line.

5. a credit verifying unit in accordance with claim 4 in which said unit is constructed to make said magnetic medium readily replaceable whereby said unit may be used to communicate selectively with a plurality of central computers.

6. A credit verifying unit in accordance with claim 4 in which said storage medium is an endless loop of magnetic tape.

7. A credit verifying unit in accordance with claim 6 in which said additional playback means includes a magnetic pick-up unit and an additional transport means for drawing said tape along said pick-up unit while in operative engagement therewith.

8. A credit verifying unit in accordance with claim 7 in which said tape includes first and second tracks, said telephone number being recorded on said first track, a number identifying the service establishment at which the unit is being used being recorded on said second track in dual tone form, and in which said pick-up unit includes two heads, one for reading each of said tracks.

9. For use with a card having a customer's identification number magnetically recorded thereon in dual tone form, a unit for transmitting and receiving data over telephone lines to and from a plurality of central locations, said unit comprising,
    magnetic tape cartridge drive means and pick-up means for cooperation with any one of a plurality of tape cartridges,
    each of said cartridge including a medium on which is magnetically recorded, in standard form, the telephone number of one of said central locations,
    means for receiving said card, and
    means jointly responsive to the application of power to said unit, the presence of a card and the presence of a cartridge for sequentially
    1. connecting said unit over a commercial telephone line with that central location the telephone number of which is recorded on said medium,
    2. reading said dual tones from said card and coupling the resulting signals to said telephone line, and
    3. receiving a reply from said central station and displaying the nature of said reply.

10. A unit for transmitting and receiving data in accordance with claim 9 in which said card has characters embossed thereon and in which each of said cartridges also includes a case having embossed thereon characters identifying the establishment at which the unit is being used and which unit also includes means for printing the characters embossed on said card and said case of said cartridge.

11. A unit for transmitting and receiving data in accordance with claim 9 in which said means for connecting comprises means including said pick-up means for reading the information recorded on said medium and applying the resulting signals to said telephone line.

12. A unit for transmitting and receiving data in accordance with claim 9 in which said medium is an endless loop of magnetic tape on which is alternately recorded said telephone number and a unique identifying tone.

13. A credit verifying unit for use at a service establishment in conjunction with a customer's credit card, which card includes a magnetic stripe on which an identification number is recorded as a series of elements, one for each digit, each element comprising two tones recorded simultaneously said unit being for requesting and receiving credit information from a central computer, comprising
    magnetic tape cartridge drive means and pick-up means for cooperation for any one of a plurality of tape cartridges,
    each of said cartridges including an endless loop of magnetic tape having two tracks on which information is recorded,
    said first track having recorded thereon, alternately, the telephone number of one of said central locations in dual tone form and a unique identifying tone,
    the other of said tracks having recorded alternately thereon a number identifying the service establishment at which the unit is used, recorded in dual tone form, and a unique identifying tone,
    means for receiving said card, and
    means jointly responsive to the application of electric power to said unit and to the presence of a card and the presence of a cartridge for sequentially
    1. reading said first track of said tape in said cartridge and impressing the resulting signal indicative of said telephone number on said telephone line,
    2. reading said second track of said tape in said cartridge and impressing the resulting signal indicative of the service establishment identification number on said telephone line,
    3. reading said dual tones from said card and coupling the resulting signals to said telephone line, and
    4. receiving a reply from said central computer and displaying the nature of said reply.

14. A credit verifying unit in accordance with claim 13 in which said card has characters embossed thereon and in which each of said cartridges also includes a case having embossed thereon characters identifying the establishment at which the unit is being used and which unit also includes means for printing the characters embossed on said card and said case of said cartridge.

* * * * *